United States Patent [19]

Mochizuki et al.

[11] Patent Number: 5,255,195

[45] Date of Patent: Oct. 19, 1993

[54] POSITION MEASURING SYSTEM FOR VEHICLE

[75] Inventors: Hirofumi Mochizuki; Takashi Mizokawa, both of Iwata, Japan

[73] Assignee: Yamaha Hatsudoki Kabushiki Kaisha, Iwata, Japan

[21] Appl. No.: 824,899

[22] Filed: Jan. 23, 1992

Related U.S. Application Data

[63] Continuation of Ser. No. 450,541, Dec. 14, 1989, abandoned.

[30] Foreign Application Priority Data

Dec. 15, 1988 [JP] Japan .................................. 63-315172

[51] Int. Cl.⁵ .................................................. G06F 15/50
[52] U.S. Cl. .................................. 364/449; 364/424.02;
180/169; 356/1
[58] Field of Search .................. 364/443, 449, 424.02;
358/103; 318/587; 180/167-169; 356/1, 152, 375

[56] References Cited

U.S. PATENT DOCUMENTS

| | | | |
|---|---|---|---|
| 4,225,226 | 9/1980 | Davidson et al. | 364/449 |
| 4,328,545 | 5/1982 | Halsall et al. | 364/443 |
| 4,626,995 | 12/1986 | Lofgren et al. | 364/424.02 |
| 4,700,301 | 10/1987 | Dyke | 364/424.02 |
| 4,796,198 | 1/1989 | Boultinghouse et al. | 364/424.02 |
| 4,817,000 | 3/1989 | Eberhardt | 364/424.02 |
| 4,820,041 | 4/1989 | Davidson et al. | 356/152 |
| 4,964,722 | 10/1990 | Schumacher | 356/152 |

Primary Examiner—Gary Chin
Attorney, Agent, or Firm—Ernest A. Beutler

[57] ABSTRACT

An arrangement for determining the position of a vehicle along a two dimensional course and for steering the vehicle to maintain a desired preset path. A sensing device is incorporated that includes markers placed at known locations and an optical sensor sequentially makes three measurements of the angle between the vehicle and the sensors, the angular course of the vehicle and the distance travelled from the last sensing so as to provide an indication of the actual vehicle position and course. The actual position is then compared with the desired position and corrections are made by the steering mechanism.

13 Claims, 4 Drawing Sheets

POSITION MEASURING SYSTEM FOR VEHICLE

This is a continuation of U.S. patent applicaiton Ser. No. 07/450,541, filed Dec. 14, 1989, now abandoned.

BACKGROUND OF THE INVENTION

This invention relates to a position measuring system for vehicles and more particularly to an improved and simplified arrangement for sensing and correcting the course of travel of a vehicle from a plurality of known markers.

There are many instances wherein it is desirable to be able to sense and control the position and course of a vehicle. Such systems permit the automatic control of a vehicle to travel along a predetermined course and to correct the course of travel in the event deviations are sensed. Position sensing and control mechanisms have a wide variety of applications. For example, this can be utilized to control the path of travel of a vehicle along a predetermined course for use in things such as travelling along a golf path, travelling along a path in a factory for conveying purposes or a wide variety of other functions.

The type of sensing devices previously used for this purpose and associated controls have required very sophisticated and expensive equipment. Although a system has been proposed which senses vehicle position by utilizing a plurality of corner markers that are positioned in known locations, the previous systems proposed for this purpose have required the simultaneous reading of the location of the vehicle relative to each of the markers. Such systems obviously become very expensive and complicated.

It is, therefore, a principal object of this invention to provide an improved and simplified arrangement for determining the position and course of a vehicle through the use of plural corner markers.

It is a further object of this invention to provide an improved position sensing and control mechanism that operates through the use of three corner markers at known locations and the successive determination of the location of the vehicle relative to these markers and the amount of travel and direction of travel of the vehicle.

SUMMARY OF THE INVENTION

This invention is adapted to be embodied in a position sensing arrangement for a vehicle travelling along a two dimensional path and is comprised of markers that are placed at known coordinates. A scanner is rotatable upon the vehicle and emits a signal for sensing the angular position of each of the markers relative to the vehicle during the travel of the vehicle along the path to provide first, second and third angular measurements. Means are provided for sensing the distance travelled by the vehicle between receipt of each of the measurements to provide first and second distanced travelled measurements. Means also sense the angular course of the vehicle upon receipt of the angular measurements to provide first and second angular course measurements. Computer means compute the location and course of the vehicle from the aforenoted measurements.

DETAILED DESCRIPTION OF THE PREFERRED EMBODIMENT OF THE INVENTION

Figure 1:
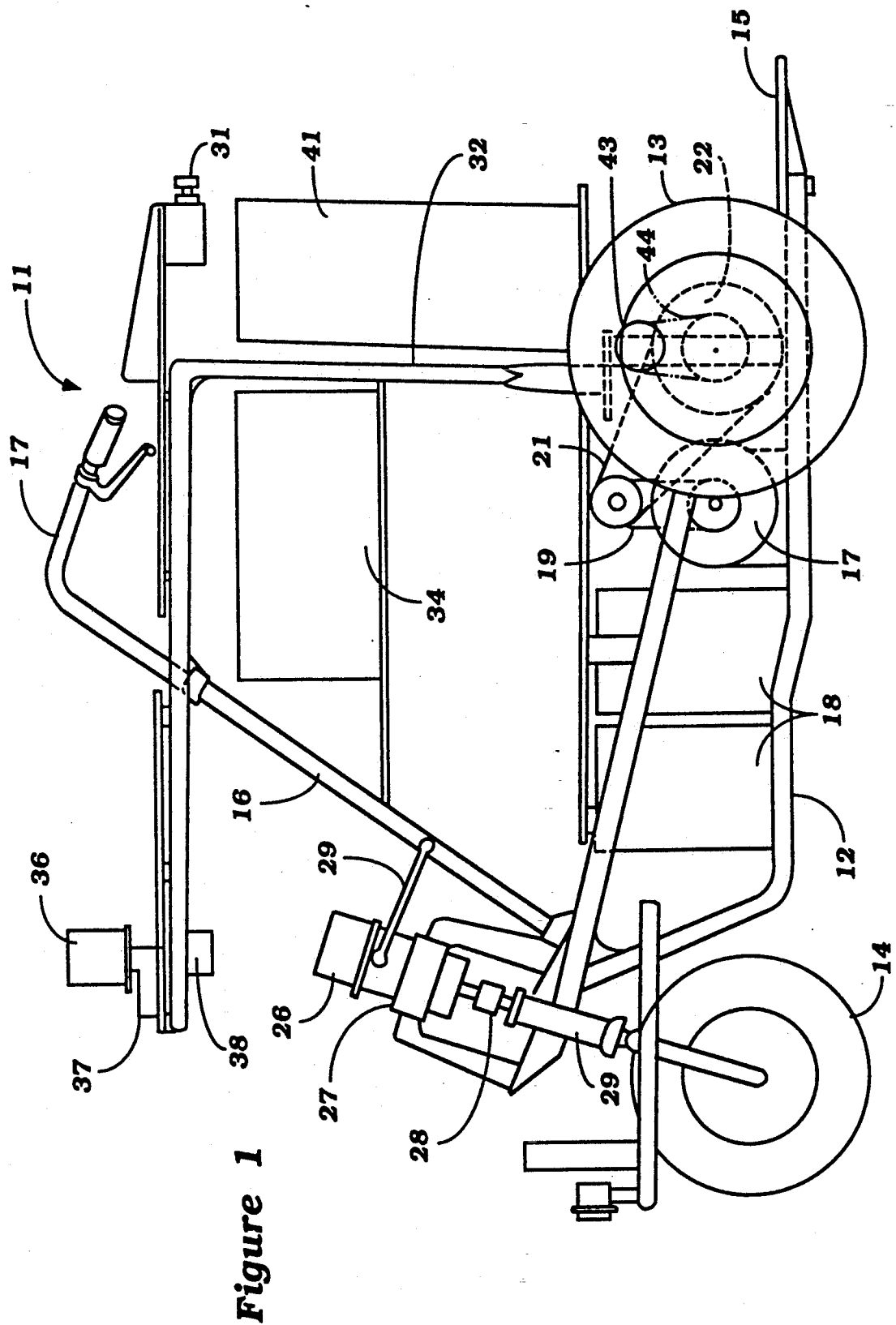
FIG. 1 is a side elevational view of a small vehicle constructed in accordance with an embodiment of the invention.

Referring first to FIG. 1, a vehicle having a control and guidance system constructed in accordance with an embodiment of the invention is identified generally by the reference numeral 11. The vehicle 11 may be of any known type but is, in the illustrated embodiment, depicted as being of the three wheel cart type of vehicle. The vehicle 11 is comprised of a frame assembly 12 that may be of any known type such as of the welded construction and rotatably supports a pair of driven rear wheels 13 and a dirigible front wheel 14. A platform 15 is provided at the rear of the frame assembly 12 so as to accommodate a rider or passenger standing thereon. A head pipe 16 of the frame assembly supports a handlebar assembly 17 that affords the operator an opportunity to control the vehicle 11 when manual control is desired.

Figure 3:
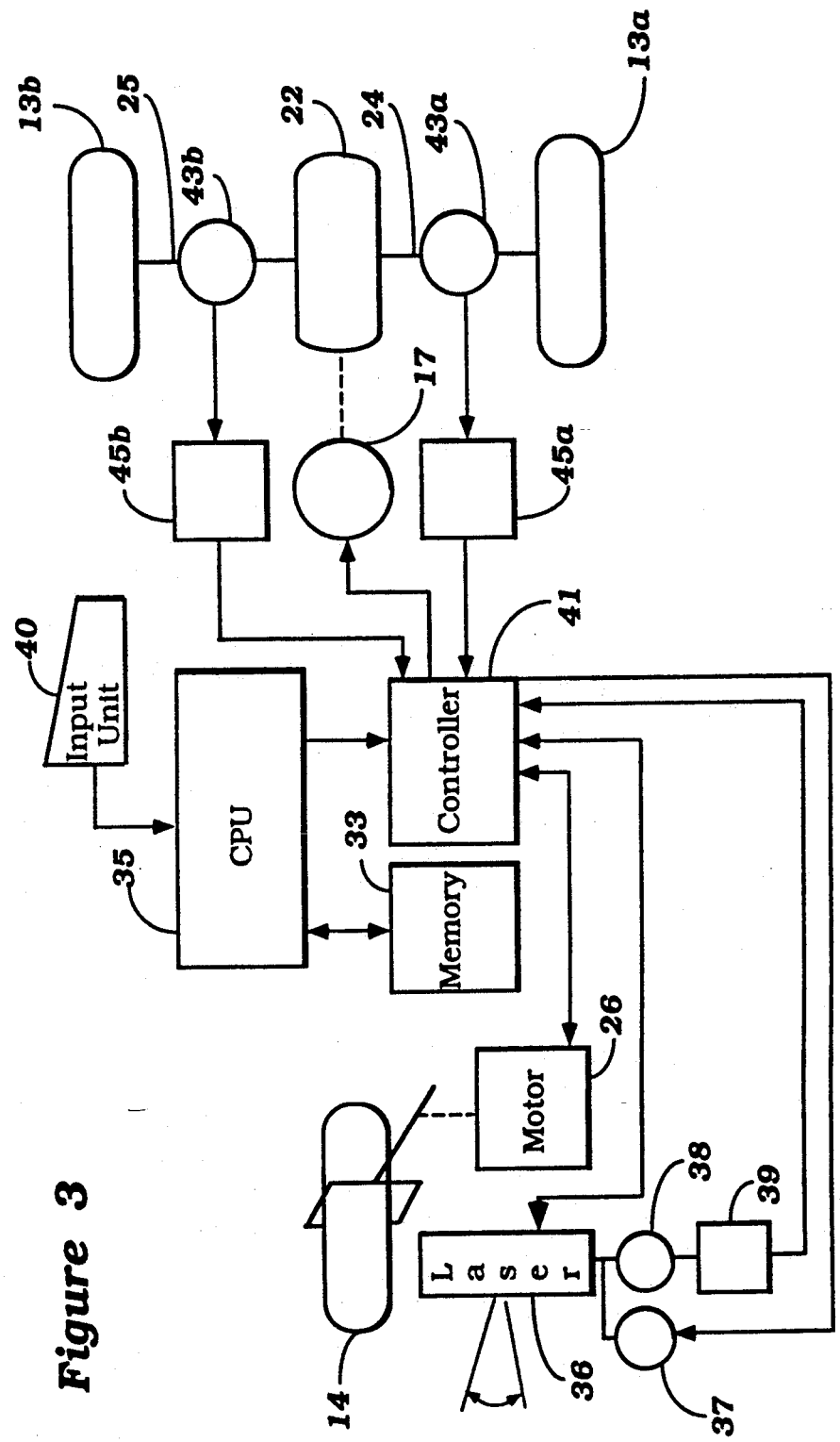
FIG. 3 is partially schematic view of the vehicle showing the components for measuring the course and location of the vehicle.
Figure 4:
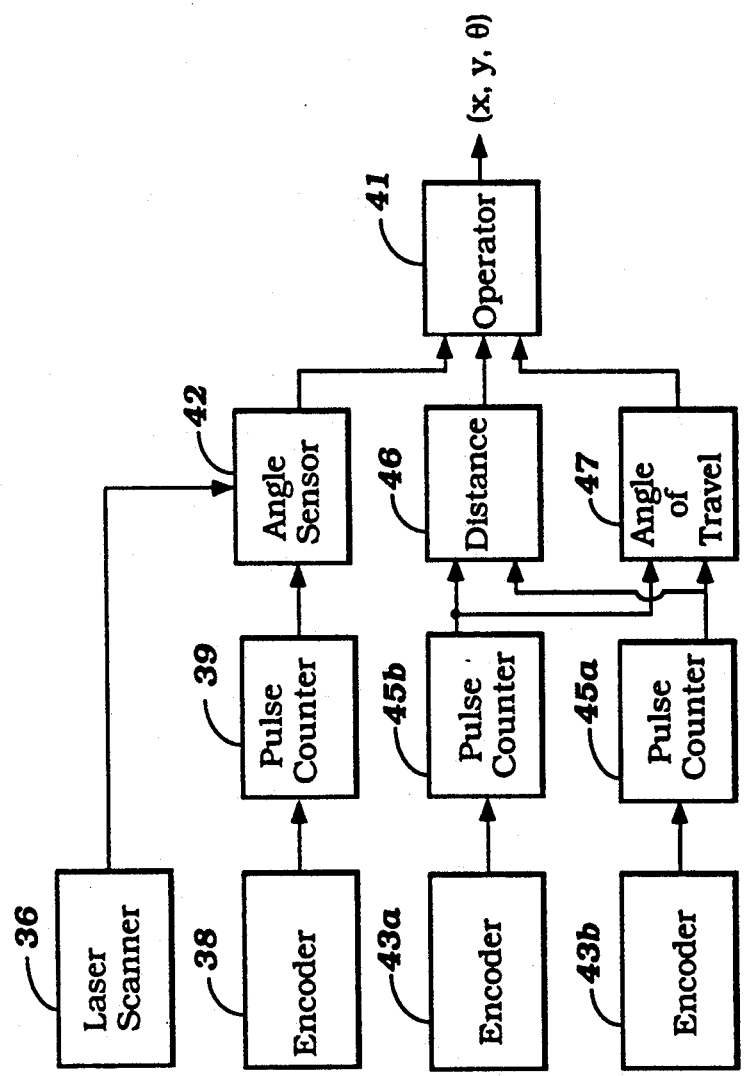
FIG. 4 is a partially schematic block diagram showing how the vehicle operation can be controlled from the sensed signals.

In the illustrated embodiment, the vehicle 11 is powered by an electric motor 17 that receives power from a pair of batteries 18 carried low within the frame 12 so as to maintain a low center of gravity for the vehicle. The motor 17 drives a first pulley 19 which, in turn, drives a second pulley 21 which, in turn, drives a differential assembly 22. The differential assembly 22, as shown in FIG. 3, drives a pair of axle shafts 24 and 25 to which the left and right rear wheels 13a and 13b are affixed in a known manner.

The front wheel 14, although capable of being steered manually, if desired, is normally steered by means of an electric steering motor 26 which through a gear train 27 is coupled by a cowling 28 to a front fork 29 which journals the wheel 14 for steering movement on the frame 12. The motor 26 is supported from the head tube 16 by means of brackets or stays 30. A main control switch 31 for controlling the on/off condition of the vehicle 11 is carried by an upwardly extending tube 32 of the frame 12 immediately forwardly of the platform 15 and to the rear of the handlebar assembly 17.

Figure 2:
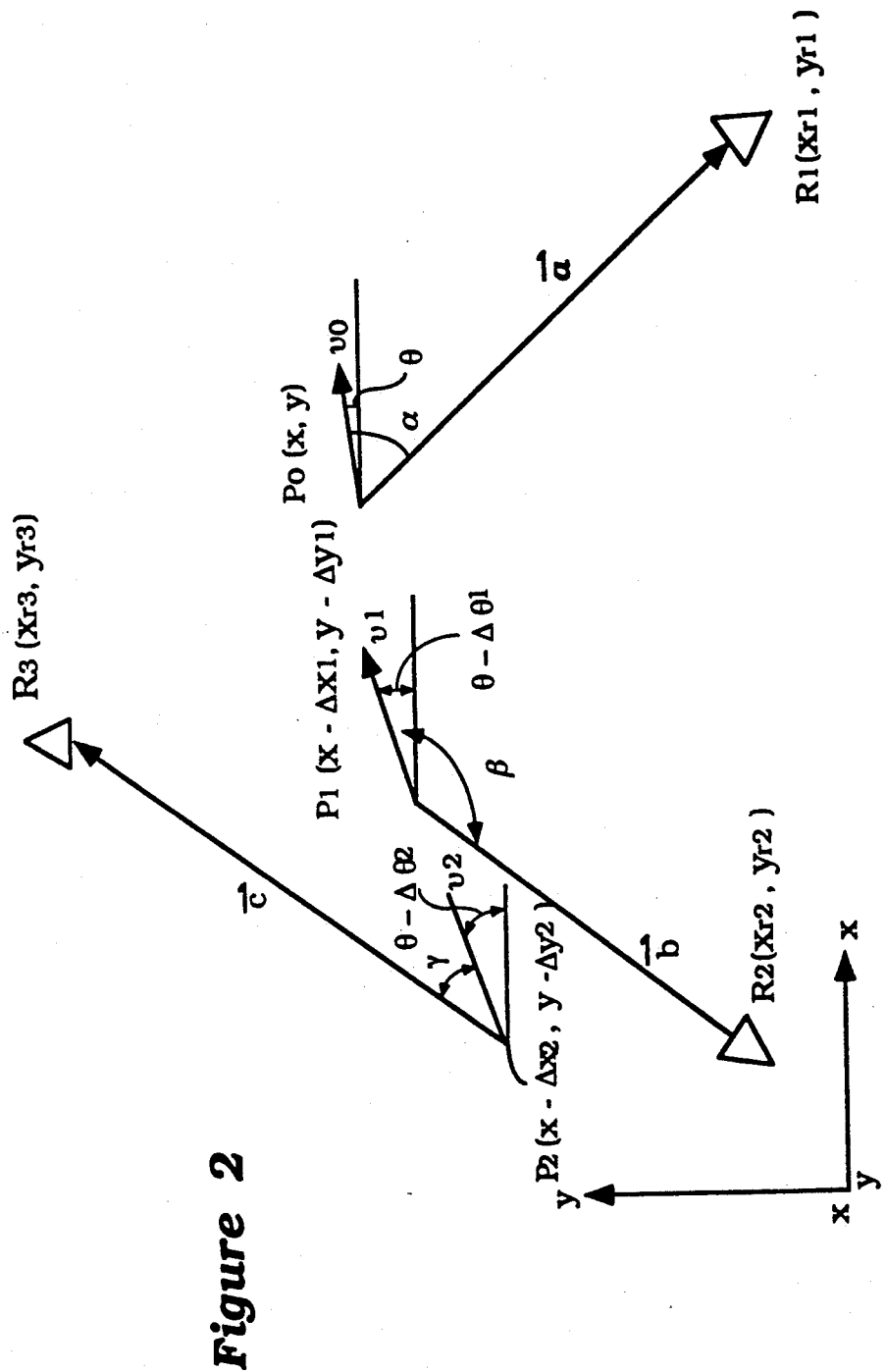
FIG. 2 is a plan view of a course along which the vehicle may travel and showing the location of the corner markers and the method of computing the course of travel and the location.

The vehicle is designed primarily to be operated automatically along a pre-program course in a two dimensional plane as shown in FIG. 2 along XX and YY axis. In order to permit this automatic control, there are provided at least three corner markers or corner cubes $R_1$, $R_2$ and $R_3$. These corner cubes $R_1$, $R_2$, and $R_3$ are located at preselected coordinates along the XX, YY axis as indicated at $Xr_1$, $Yr_1$, $Xr_2$, $Yr_2$ and $Xr_3$, $Yr_3$. The desired course for the path of travel of the vehicle 11 is preprogrammed into a memory 33 from an input unit 40 (FIG. 3) of a CPU assembly 34 (FIG. 1) that is carried by the frame assembly 12 in a suitable manner. This CPU assembly 34 further includes a CPU 35 that has a preprogrammed system, to be described, so as to measure the location and course of travel of the vehicle 11, compare it with the predetermined desired course and make corrections through operation of the steering motor 26 as may be required.

The positions and course sensing mechanism includes a laser scanner 36 that is mounted on the frame assembly 12 and which is rotatably driven by an electric motor 37 so as to rotate through 360 degrees and to emanate a light signal which will be selectively reflected from of the corner cubes $R_1$, $R_2$, and $R_3$. When the reflection is received back, the angular position is read by an encoder 38 and this signal is sent to a pulse counter 39 which, in turn, outputs a signal indicative of the angular position of the respective corner cubes to a controller 41. The CPU 35 has an angle sensing section 42 that will measure and compute the angle of the laser scanner 36 and to provide a signal as will be described, indicative of the angular position of the respective corner cubes $R_1$, $R_2$, and $R_3$, relative to the vehicle during successive readings.

An arrangement is also provided for measuring the course of the vehicle 11 and the distanced travelled. To this end, there are provided a pair of encoders 43a and 43b which are associated with the axle shafts 24 and 25 of the left and right rear wheels 13. These encoders 43 may be driven from the axle shafts by respective belt drive transmission 44. The encoders 43a and 43b output signals to respective pulse counters 45a and 45b that provide digital signals indicative of the angular position of the wheels 13 or their amount of travel.

The outputs from the pulse counters 45a and 45b are transmitted to the CPU 35 which has a distance measuring function section 46 that computes the distance travelled from the amount of rotation of the rear wheels 13 and also a device 47 that computes the angle or course $\Delta\theta_1$, $\Delta\theta_2$ of the vehicle 11 which is determined by the difference between the measurements of the encoders 43a and 43b.

The way the device operates so as to sense the location and course of the vehicle 11 and make corrections, if desired, may be best understood by reference to FIG. 2. As seen in this figure, the present position $P_0$ having the coordinates XY and course $V_0$ may be determined by calculation from the predetermined readings taken at the previous positions $P_1$ and $P_2$. Said another way, the device operates so as to cause the optical scanner 36 to rotate and sequentially take position measurements of the angle to the corner cubes $R_3$, $R_2$, and $R_1$ in sequence. That is, at the position $P_2$, the optical sensor senses the angle $\gamma$ to the corner cube $R_3$ and also records the direction of travel $V_2$ which is, as has been previously noted, determined by the angle sensor 47 from the outputs of the encoders 43a and 43b.

As the scanner 36 continues to rotate, the angle $\beta$ between the course of travel $V_1$ and the angular location of the corner cube $R_2$ is sensed by the reflection back from this corner cube. Next, the angle $\alpha$ between the direction of the travel $V_0$ and the corner cube $R_1$ are measured as aforenoted upon the reflection back from this corner cube as the scanner 36 continues to rotate.

In the sequence described herein, it is assumed that the location and path of travel of the vehicle 11 will be such that the optical scanner will first see the corner cube $R_3$ next the corner cube $R_2$ and finally the corner cube $R_1$ as it rotates. This would occur in the illustrated example when the optical scanner is rotating in a counterclockwise direction as viewed in FIG. 2. Of course, the system will operate if the corner cubes ar scanned in a different relationship due to the position of the vehicle 11. In fact, the system will operate even if one of the corner cubes is obstructed and cannot be read. All that is required is three successive readings of the angles from corner cubes. That is, the successive readings could be of $R_3$, $R_1$, and $R_3$ or any other sequence.

It is obvious that the following relationship exists between the relative instantaneous locations $P_0$, $P_1$ and $P_2$ of the vehicle exist at the time of each measurement.

$P_0 (x, y)$ $P_1 (x-\Delta x_1, y-\Delta y_1)$ $P_2 (x-\Delta x_2, y-\Delta y_2)$ In these equations, the distances $\Delta x_1$, $\Delta x_2$, $\Delta y_1$, $\Delta y_2$, are the degrees of movement in the XY coordinates between the respective positions $P_2$, $P_1$ and $P_0$ when each reflected signal is received.

It is also known that the vehicle course ($V_2$, $V_1$ and $V_0$) are equal to the following relationships:

$\vec{v}_0 = (\cos\theta, \sin\theta)$ $\vec{v}_1 = (\cos(\theta-\Delta\theta_1), \sin(\theta-\Delta\theta_1))$ $\vec{v}_2 = (\cos(\theta-\Delta\theta_2), \sin(\theta-\Delta\theta_2))$ From these measurements it is then possible to define the distance to the respective corner cubes at each location from the following location, with the distances being identified by the vectors a, b, & c defined as follows:

$\vec{a} = (x_{r1}-x, y_{r1}-y)$ $\vec{b} = (x_{r2}-x+\Delta x_1, y_{r2}-y+\Delta y_1)$ $\vec{c} = (x_{r3}-x+\Delta x_2, y_{r3}-y+\Delta y_2)$ The following relationships hold true which then permits the device to compute the course of travel of the vehicle 11 and its location.

$$\vec{a} \cdot \vec{v}_0 = (x_{r1} - x)\cos\theta + (y_{r1} - y)\sin\theta \quad (1)$$
$$= |\vec{a}| \cdot |\vec{v}_0| \cos\alpha$$

$$\vec{b} \cdot \vec{v}_1 = |\vec{b}| \cdot |\vec{v}_1| \cos\beta \quad (2)$$

$$\vec{c} \cdot \vec{v}_2 = |\vec{c}| \cdot |\vec{v}_2| \cos\gamma \quad (3)$$

Having this information, therefore, it is obviously possible for the device to sense the actual position and course of the vehicle from the sequential readings of the angle between the vehicle and the individual corner cubes $R_3$, $R_2$ and $R_1$, the instantaneous course of the vehicle and the distance travelled during the aforenoted measurements. This information can then be used to correct course of the vehicle and maintain it on the predetermined or desired course. Therefore, it should be readily apparent that this construction permits a very simple and highly effective arrangement for determining the course of the vehicle through the use of three corner markers and taking sequential readings of the aforenoted function. This offers a much simpler and lower cost system than was possible with the prior art.

It is to be understood that the foregoing description is that of a preferred embodiment of the invention and that various changes and modifications may be made, without departing from the spirit and scope of the invention, as defined by the appended claims.

We claim:

1. A position sensing arrangement for a dirigible vehicle travelling along a two dimensional path comprising markers placed at known coordinates, a scanner rotatable upon said vehicle and emitting a signal for sensing at least three angular positions of said markers relative to said vehicle in sequence during the travel of said vehicle along said path to provide first, second and third angular measurements, first vehicle measurement means other than said scanner for sensing the distance travelled by said vehicle between each of said angular measurements to provide first and second distance measurements, and second vehicle measurement means other than said scanner for sensing the course of the vehicle between each angular measurement to provide first and second angular course measurements, computing means for computing the actual location and the actual course of said vehicle from said first and second distance measurements and from said first and second angular course measurements, and means for controlling said vehicle based on the computed actual location and the actual course.

2. A position sensing arrangement for a vehicle as set forth in claim 1, wherein the scanner comprises a laser scanner and wherein the markers reflect the light from the laser to provide the angular measurements.

3. A position sensing arrangement for a vehicle as set forth in claim 1, wherein the vehicle is a wheeled vehicle and the first and second vehicle distance measurements are made by measuring the revolutions of one of the wheels.

4. A position sensing arrangement for a vehicle as set forth in claim 3, wherein there are two wheels on opposite sides of the vehicle and the second vehicle measurement means senses the course by measuring the difference in angular rotations between the two wheels.

5. A position sensing arrangement for a vehicle as set forth in claim 3, wherein the one wheel is a driven wheel.

6. A position sensing arrangement for a vehicle as set forth in claim 4, wherein the said two wheels are both driven wheels driven through a differential.

7. A position sensing arrangement for a vehicle as set forth in claim 4, wherein the scanner comprises a laser scanner and wherein the markers reflect the light from the laser to provide the angular measurements.

8. A position sensing arrangement for a vehicle as set forth in claim 1, wherein the computing means further has means for accepting a desired course program and wherein the computing means compares the actual course with the desired course program and the controlling means effects the steering of a vehicle steering system to maintain the vehicle on the desired course.

9. A position sensing arrangement for a vehicle as set forth in claim 8, wherein the vehicle is a wheeled vehicle and the first and second vehicle distance measurements are made by measuring the revolutions of one of the wheels.

10. A position sensing arrangement for a vehicle as set forth in claim 9, wherein there are two wheels on opposite sides of the vehicle and the second vehicle measuring means senses the course by measuring the difference in angular rotations between the two wheels.

11. A position sensing arrangement for a vehicle as set forth in claim 9, wherein the one wheel is a driven wheel.

12. A position sensing arrangement for a vehicle as set forth in claim 10, wherein the two wheels are both driven wheels driven through a differential.

13. A position sensing arrangement for a vehicle as set forth in claim 10, wherein the scanner comprises a laser scanner and wherein the markers reflect the light from the laser.

* * * * *